United States Patent
Ananthpadmanabhan et al.

(10) Patent No.: US 6,477,502 B1
(45) Date of Patent: Nov. 5, 2002

(54) METHOD AND APPARATUS FOR USING NON-SYMMETRIC SPEECH CODERS TO PRODUCE NON-SYMMETRIC LINKS IN A WIRELESS COMMUNICATION SYSTEM

(75) Inventors: Ananth Ananthpadmanabhan; Andrew P. DeJaco, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 96 days.

(21) Appl. No.: 09/643,360

(22) Filed: Aug. 22, 2000

(51) Int. Cl.[7] .................. G10L 21/04; G10L 19/14; H04B 1/10; H04Q 7/20; H04M 3/22
(52) U.S. Cl. ................ 704/503; 704/500; 704/201; 455/305; 455/453; 379/55.1; 379/32.03
(58) Field of Search .................. 270/100; 704/201–230, 704/500–504; 370/260–331, 468, 567; 455/342, 422–524, 305; 379/55.1, 32.03

(56) References Cited

U.S. PATENT DOCUMENTS

| | | | |
|---|---|---|---|
| 3,663,760 A | * 5/1972 | De Witt ...................... | 370/506 |
| 5,414,796 A | 5/1995 | Jacobs et al. | |
| 5,715,516 A | * 2/1998 | Howard et al. .............. | 455/422 |
| 5,727,123 A | 3/1998 | McDonough et al. | |
| 5,784,532 A | 7/1998 | McDonough et al. | |
| 5,812,534 A | * 9/1998 | Davis et al. ................ | 370/537 |
| 5,911,128 A | 6/1999 | DeJaco | |
| 6,205,129 B1 | * 3/2001 | Esteves et al. .............. | 455/451 |

FOREIGN PATENT DOCUMENTS

| | | | |
|---|---|---|---|
| EP | 0715431 | 6/1996 | ............. H04L/1/00 |
| GB | 2332820 | 6/1999 | ............ H04Q/7/30 |

OTHER PUBLICATIONS

O'Byrne ("Increase in Performance of a New or Deployed System by Cell Site Re-Configuration", IEEE Vehicular Technology Conference, Sep. 1999).*

Bruhn et al., "Concepts and Solutions for Link Adaption and Inband Signaling for the GSM AMR Speech Coding Standard," *IEEE Vehicular Technology Conference, XX, XX*, Document No. XP002901443, May 16, 1999, pp. 2451–2455.

Tateesh et al., "Link Adaptive Multi-rate Coding Verification system for CDMA mobile Communications," *Communications: The Key to Global Prosperity*, Global Telecommunications Conference (GLOBECOM) vol. 3, pp. 1969–1973, Nov. 18, 1996.

Uvliden et al., "Adaptive Multi-Rate –A Speech Service Adapted to Cellular Radio Network Quality" *Signals, Systems & Computers 1998*, Conference Record of the Thirty–second Asilomar Conference, vol. 1, pp. 343–347, 1998.

* cited by examiner

Primary Examiner—Marsha D. Banks-Harold
Assistant Examiner—Daniel A Nolan
(74) Attorney, Agent, or Firm—Phillip Wadsworth; Kent D. Baker; Kyong H. Macek

(57) ABSTRACT

A method and apparatus for balancing the forward link capacity of a wireless communication system with the reverse link capacity of the system is presented. Speech coders with selectable modes are implemented in both links so that a forward link speech coder will not be operating with a mode set that is identical to the mode set used by a reverse link speech coder. Since the reverse link has a higher user capacity than a forward link, the reverse link speech coder can operate with a higher average data rate. Hence, the mode set used by the reverse link speech coder can be implemented without low average data rate modes. Elimination of modes from the mode set reduces complexity of the speech coder.

7 Claims, 8 Drawing Sheets

METHOD AND APPARATUS FOR USING NON-SYMMETRIC SPEECH CODERS TO PRODUCE NON-SYMMETRIC LINKS IN A WIRELESS COMMUNICATION SYSTEM

BACKGROUND

I. Field of the Invention

The present invention pertains generally to the field of wireless communications, and more specifically to methods and apparatus for producing non-symmetric links over-the-air in a wireless communication system.

II. Background

Transmission of voice by digital techniques has become widespread, particularly in long distance and digital radio telephone applications. This, in turn, has created interest in determining the least amount of information that can be sent over a channel while maintaining the perceived quality of the reconstructed speech. If speech is transmitted by simply sampling and digitizing, a data rate on the order of sixty-four kilobits per second (kbps) is required to achieve a speech quality of conventional analog telephone. However, through the use of speech analysis, followed by the appropriate coding, transmission, and resynthesis at the receiver, a significant reduction in the data rate can be achieved.

Devices for compressing speech find use in many fields of telecommunications. An exemplary field is wireless communications. The field of wireless communications has many applications including, e.g., cordless telephones, paging, wireless local loops, wireless telephony such as cellular and PCS telephone systems, mobile Internet Protocol (IP) telephony, and satellite communication systems. A particularly important application is wireless telephony for mobile subscribers.

Various over-the-air interfaces have been developed for wireless communication systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile Communications (GSM), and Interim Standard 95 (IS-95). An exemplary wireless telephony communication system is a code division multiple access (CDMA) system. The IS-95 standard and its derivatives, IS-95A, ANSI J-STD-008, IS95B, proposed third generation standards IS-95C and IS-2000, etc. (referred to collectively herein as IS-95), are promulgated by the Telecommunication Industry Association (TIA) and other well known standards bodies to specify the use of a CDMA over-the-air interface for cellular or PCS telephony communication systems. Exemplary wireless communication systems configured substantially in accordance with the use of the IS-95 standard are described in U.S. Pat. Nos. 5,103,459 and 4,901,307, which are assigned to the assignee of the present invention and fully incorporated herein by reference.

Devices that employ techniques to compress speech by extracting parameters that relate to a model of human speech generation are called speech coders. A speech coder divides the incoming speech signal into blocks of time, or analysis frames. Speech coders typically comprise an encoder and a decoder. The encoder analyzes the incoming speech frame to extract certain relevant parameters, and then quantizes the parameters into binary representation, i.e., to a set of bits or a binary data packet. The data packets are transmitted over the communication channel to a receiver and a decoder. The decoder processes the data packets, unquantizes them to produce the parameters, and resynthesizes the speech frames using the unquantized parameters.

The function of the speech coder is to compress the digitized speech signal into a low-bit-rate signal by removing all of the natural redundancies inherent in speech. The digital compression is achieved by representing the input speech frame with a set of parameters and employing quantization to represent the parameters with a set of bits. If the input speech frame has a number of bits $N_i$ and the data packet produced by the speech coder has a number of bits $N_o$, the compression factor achieved by the speech coder is $C_r = N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

One effective technique to encode speech is multi-mode coding. An exemplary multi-mode coding technique is described in U.S. application Ser. No. 09/217,341, entitled VARIABLE RATE SPEECH CODING, filed Dec. 21, 1998, assigned to the assignee of the present invention, and fully incorporated herein by reference. Conventional multi-mode coders apply different modes, or encoding-decoding algorithms, to different types of input speech frames. Each mode, or encoding-decoding process, is customized to optimally represent a certain type of speech segment, such as, e.g., voiced speech, unvoiced speech, transition speech (e.g., speech occurring between periods of voiced and unvoiced speech), and background noise (silence, or nonspeech) in the most efficient manner. An external, open-loop mode decision mechanism examines the input speech frame and makes a decision regarding which mode to apply to the frame. The open-loop mode decision is typically performed by extracting a number of parameters from the input frame, evaluating the parameters as to certain temporal and spectral characteristics, and basing a mode decision upon the evaluation.

Presently, there is a strong commercial need to increase the efficiency of transmissions within a wireless communication network. As discussed above, the extraction of speech parameters from speech samples to obtain a high target compression factor $C_r$ is one method for creating an efficient system. However, the efficient packing of speech information into binary data packets does not completely address the present problem of reducing bottlenecks in the over-the-air transmission of data packets from a base station to a remote station. In this specification, base station refers to the hardware with which the remote stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In a CDMA system, communications between users are conducted through one or more base stations. A first user on one remote station communicates to a second user on a second remote station by transmitting data on the reverse link to a base station. The base station receives the data and can route the data to another base station. The data is transmitted on the forward link of the same base station, or a second base station, to the second remote station. The forward link refers to transmission from the base station to a remote station and the reverse link refers to transmission from the remote station to a base station. In IS95 and IS-2000 systems, the forward link and the reverse link are allocated separate frequencies.

The forward link comprises a plurality of pilot and traffic channels, wherein each channel is spread by an appropriate Walsh or quasi-orthogonal function. Each channel is then spread by a quadrature pair of pseudonoise (PN) sequences at a fixed chip rate of 1.2288 Mcps. The use of Walsh codes and PN sequences allows a base station to generate multiple forward link CDMA channels. The reverse traffic channels can also comprise multiple channels, as specified by the radio configurations of each individual subscriber network.

Each channel is physically constructed to achieve functionally different purposes. For example, a pilot channel may be simply spread using Walsh code "$W_o$" but a synchronization channel is an encoded, interleaved, spread, and modulated spread spectrum signal. The other forward and reverse link channels are also encoded, interleaved, spread, and modulated spread spectrum signals, but manipulated with various values to satisfy various requirements imposed by the appropriate telecommunication standard.

SUMMARY OF THE INVENTION

A novel and improved method and apparatus for producing non-symmetric links is presented. In one embodiment, the non-symmetric links are for balancing the capacity of a forward link in a wireless communication system with the capacity of a reverse link in the wireless communication system, comprising the steps of: operating a first speech coder with a first set of modes on the forward link, wherein at least one mode in the first set of modes is associated with a low average data rate; and operating a second speech coder in a second set of modes on the reverse link, wherein each mode in the second set of modes is associated with a high average data rate.

In another embodiment, a method for transmitting frames of data in a forward link and a reverse link of a wireless communication system is presented, the method comprising the steps of: operating a forward link speech coder in a first plurality of modes; and operating a reverse link speech coder in a second plurality of modes, wherein at least one mode in the second plurality of modes is different from each mode in the first plurality of modes.

In another embodiment, a method for transmitting frames of data in a forward link and a reverse link of a wireless communication system is presented, the method comprising the steps of: operating a forward link speech coder in a first plurality of modes; and operating a reverse link speech coder in a second plurality of modes, wherein at least one mode in the first plurality of modes is different from each mode in the second plurality of modes.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The embodiments are directed towards non-symmetric speech coders that will produce non-symmetric forward and reverse links. The production of non-symmetric forward and reverse links uses an imbalance in the Erlang capacity of the forward link and the Erlang capacity in the reverse link to reduce the complexity of speech coders in the reverse link. An Erlang is measure of traffic flow, wherein one Erlang is equal to one voice channel continuously in use or the equivalent number of channels used for a lesser time. The exemplary embodiments described herein below reside in a wireless telephony communication system configured to employ a CDMA over-the-air interface. Nevertheless, it would be understood by those skilled in the art that a method and apparatus for creating non-symmetric links may reside in any of various communication systems employing a wide range of technologies known to those of skill in the art.

An Exemplary CDMA System

Figure 1:
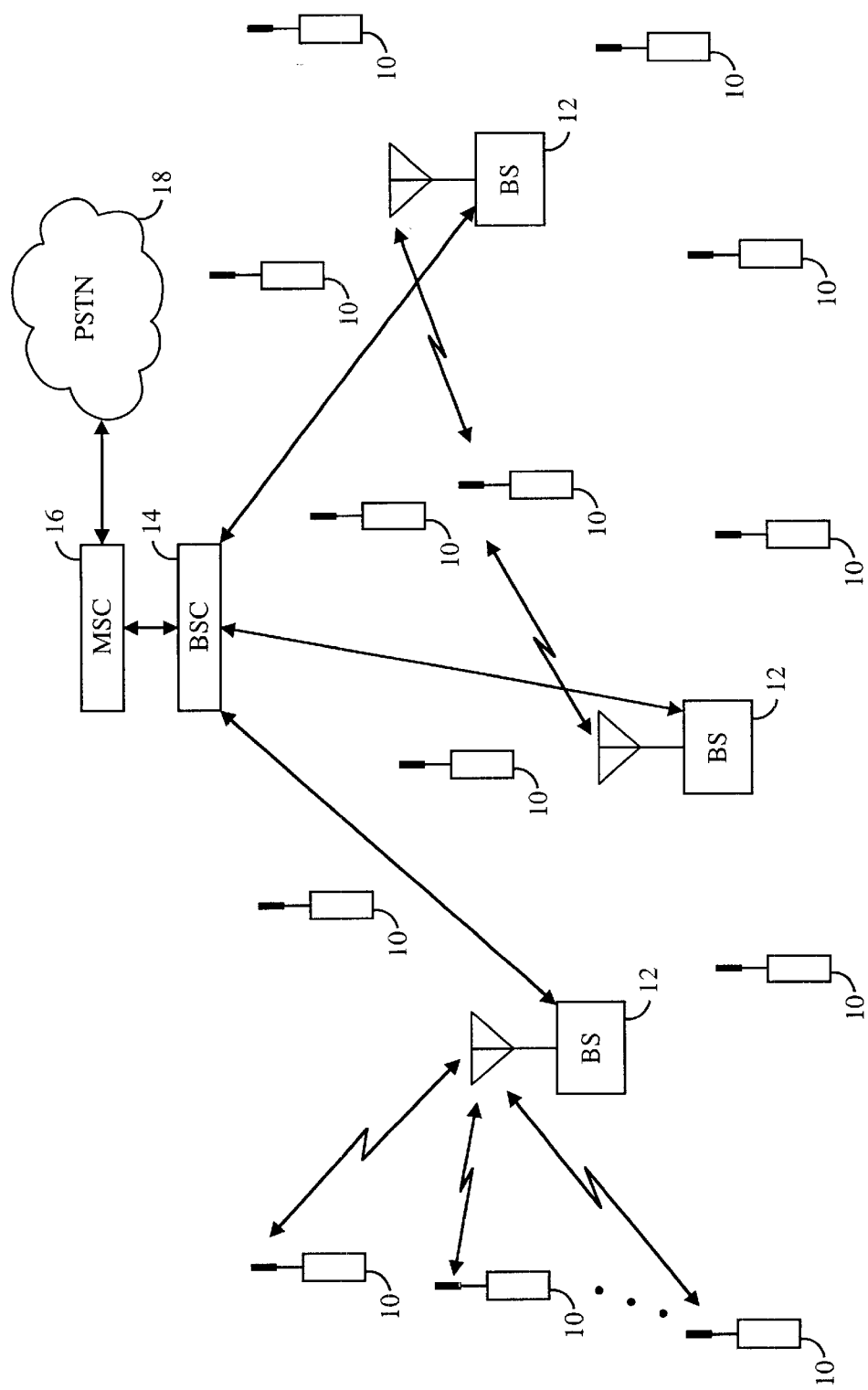
FIG. 1 is a block diagram of a wireless telephone system.

As illustrated in FIG. 1, a CDMA wireless telephone system generally includes a plurality of mobile subscriber units 10, a plurality of base stations 12, base station controllers (BSCs) 14, and a mobile switching center (MSC) 16. The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured to support any of several known interfaces including, e.g., E1/T1, ATM, IP, PPP, Frame Relay, HDSL, ADSL, or xDSL. It is understood that there may be more than two BSCs 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. Alternatively, individual sectors of a given BTS 12 may be referred to as cell sites. The mobile subscriber units 10 are typically cellular or PCS telephones 10. The system is advantageously configured for use in accordance with the IS-95 standard.

During typical operation of the cellular telephone system, the base stations 12 receive sets of reverse link signals from sets of mobile units 10. The mobile units 10 are conducting telephone calls or other communications. Each reverse link signal received by a given base station 12 is processed within that base station 12. The resulting data is forwarded to the BSCs 14. The BSCs 14 provides call resource allocation and mobility management functionality including the orchestration of soft handoffs between base stations 12. The BSCs 14 also routes the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward link signals to sets of mobile units 10. It should be understood by those of skill that the subscriber units 10 may be fixed units in alternate embodiments.

Encoders and Decoders in a Wireless Communication System

Figure 2:
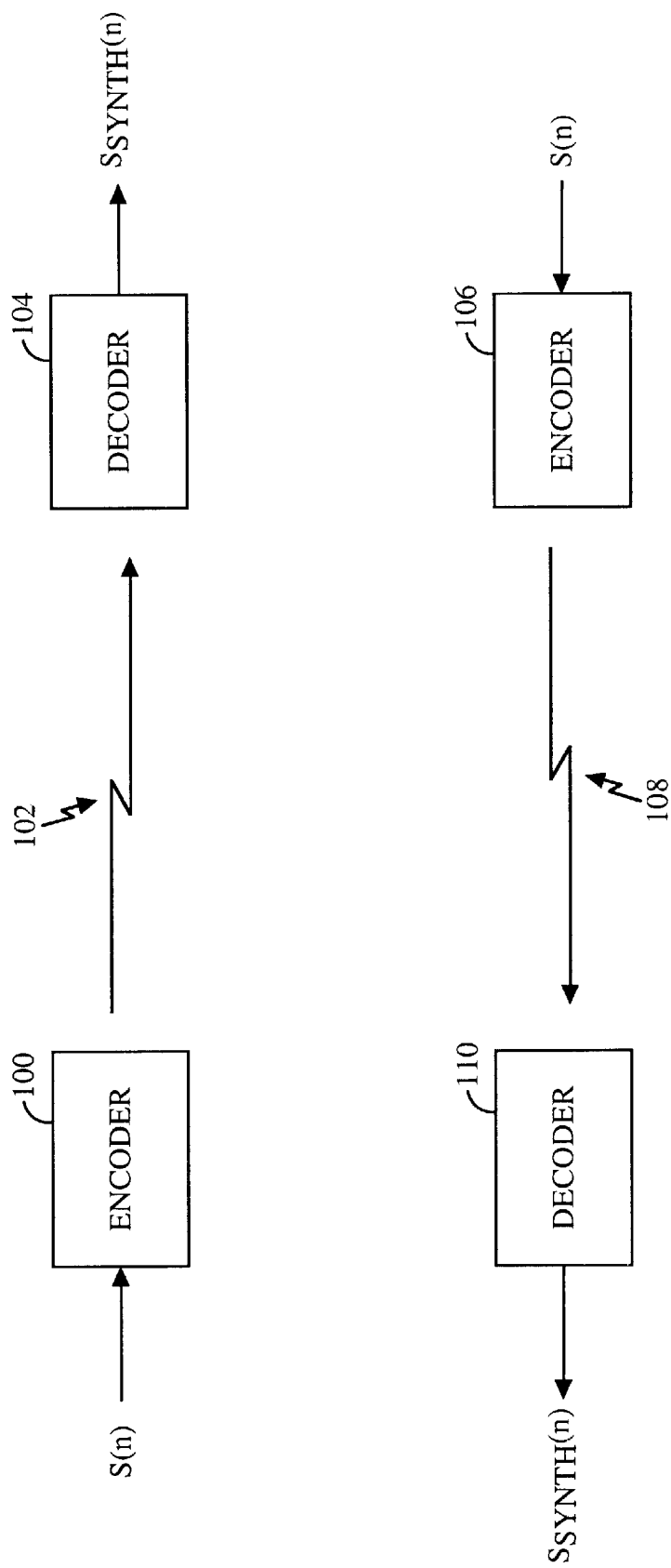
FIG. 2 is a block diagram of a communication channel terminated at each end by speech coders.

In FIG. 2 a first encoder 100 receives digitized speech samples s(n) and encodes the samples s(n) for transmission on a transmission medium 102, or communication channel 102, to a first decoder 104. The decoder 104 decodes the encoded speech samples and synthesizes an output speech signal $s_{SYNTH}(n)$. For transmission in the opposite direction, a second encoder 106 encodes digitized speech samples s(n), which are transmitted on a communication channel 108. A second decoder 110 receives and decodes the encoded speech samples, generating a synthesized output speech signal $s_{SYNTH}(n)$.

The speech samples s(n) represent speech signals that have been digitized and quantized in accordance with any of various methods known in the art including, e.g., pulse code modulation (PCM), companded $\mu$-law, or A-law. As known in the art, the speech samples s(n) are organized into frames of input data wherein each frame comprises a predetermined number of digitized speech samples s(n). In an exemplary embodiment, a sampling rate of 8 kHz is employed, with each 20 ms frame comprising 160 samples. In the embodiments described below, the rate of data transmission may advantageously be varied on a frame-by-frame basis from full rate to half rate to quarter rate to eighth rate. Varying the data transmission rate is advantageous because lower bit rates may be selectively employed for frames containing relatively less speech information. As understood by those skilled in the art, other sampling rates and/or frame sizes may be used. Also in the embodiments described below, the speech encoding (or coding) mode may be varied on a frame-by-frame basis in response to the speech information or energy of the frame.

The first encoder 100 and the second decoder 110 together comprise a first speech coder (encoder/decoder), or speech codec. The speech coder could be used in any communication device for transmitting speech signals, including, e.g., the subscriber units, BTSs, or BSCs described above with reference to FIG. 1. Similarly, the second encoder 106 and the first decoder 104 together comprise a second speech coder. It is understood by those of skill in the art that speech coders may be implemented with a digital signal processor (DSP), an application-specific integrated circuit (ASIC), discrete gate logic, firmware, or any conventional programmable software module and a microprocessor. The software module could reside in RAM memory, flash memory, registers, or any other form of storage medium known in the art. Alternatively, any conventional processor, controller, or state machine could be substituted for the microprocessor. Exemplary ASICs designed specifically for speech coding are described in U.S. Pat. No. 5,727,123, assigned to the assignee of the present invention and fully incorporated herein by reference, and U.S. Pat. No. 5/784,532, entitled VOCODER ASIC, filed Feb. 16, 1994, assigned to the assignee of the present invention, and fully incorporated herein by reference.

Encoder Structure

Figure 3:
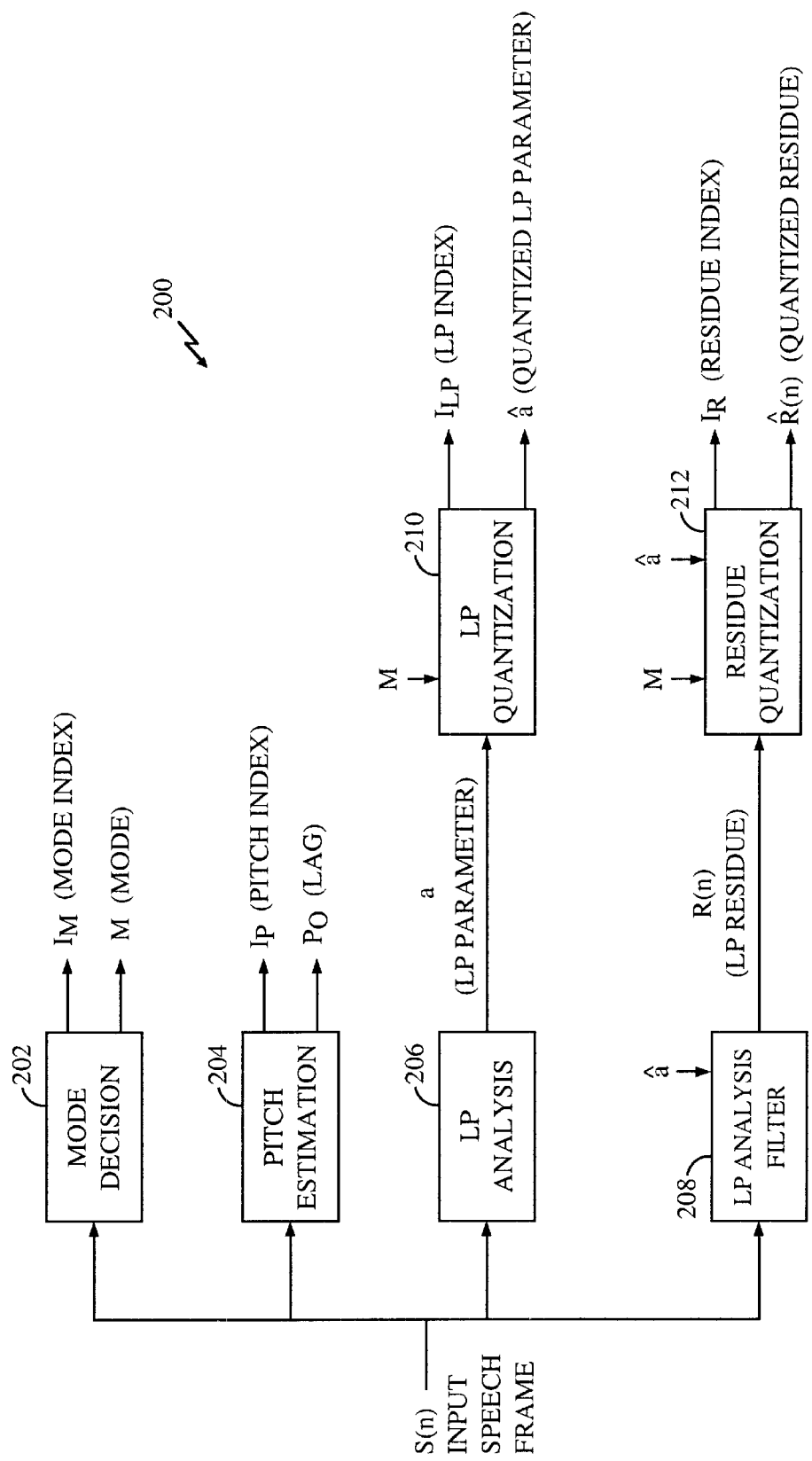
FIG. 3 is a block diagram of a speech encoder.

In FIG. 3 an encoder 200 that may be used in a speech coder includes a 15 mode decision module 202, a pitch estimation module 204, an LP analysis module 206, an LP analysis filter 208, an LP quantization module 210, and a residue quantization module 212. Input speech frames s(n) are provided to the mode decision module 202, the pitch estimation module 204, the LP analysis module 206, and the LP analysis filter 208. The mode decision module 202 produces a mode index $I_M$ and a mode M based upon the periodicity, energy, signal-to-noise ratio (SNR), or zero crossing rate, among other features, of each input speech frame s(n). Various methods of classifying speech frames according to periodicity are described in U.S. Pat. No. 5,911,128, which is assigned to the assignee of the present invention and fully incorporated herein by reference. Such methods are also incorporated into the Telecommunication Industry Association Interim Standards TIA/EIA IS-127 and TIA/EIA IS-733. An exemplary mode decision scheme is also described in the aforementioned U.S. application Ser. No. 09/217,341.

The pitch estimation module 204 produces a pitch index $I_P$ and a lag value $P_O$ based upon each input speech frame s(n). The LP analysis module 206 performs linear predictive analysis on each input speech frame s(n) to generate an LP parameter a. The LP parameter a is provided to the LP quantization module 210. The LP quantization module 210 also receives the mode M, thereby performing the quantization process in a mode-dependent manner. The LP quantization module 210 produces an LP index $I_{LP}$ and a quantized LP parameter â. The LP analysis filter 208 receives the quantized LP parameter â in addition to the input speech frame s(n). The LP analysis filter 208 generates an LP residue signal R[n], which represents the error between the input speech frames s(n) and the reconstructed speech based on the quantized linear predicted parameters â. The LP residue R[n], the mode M, and the quantized LP parameter â are provided to the residue quantization module 212. Based upon these values, the residue quantization module 212 produces a residue index $I_R$ and a quantized residue signal R̂[n].

Decoder Structure

Figure 4:
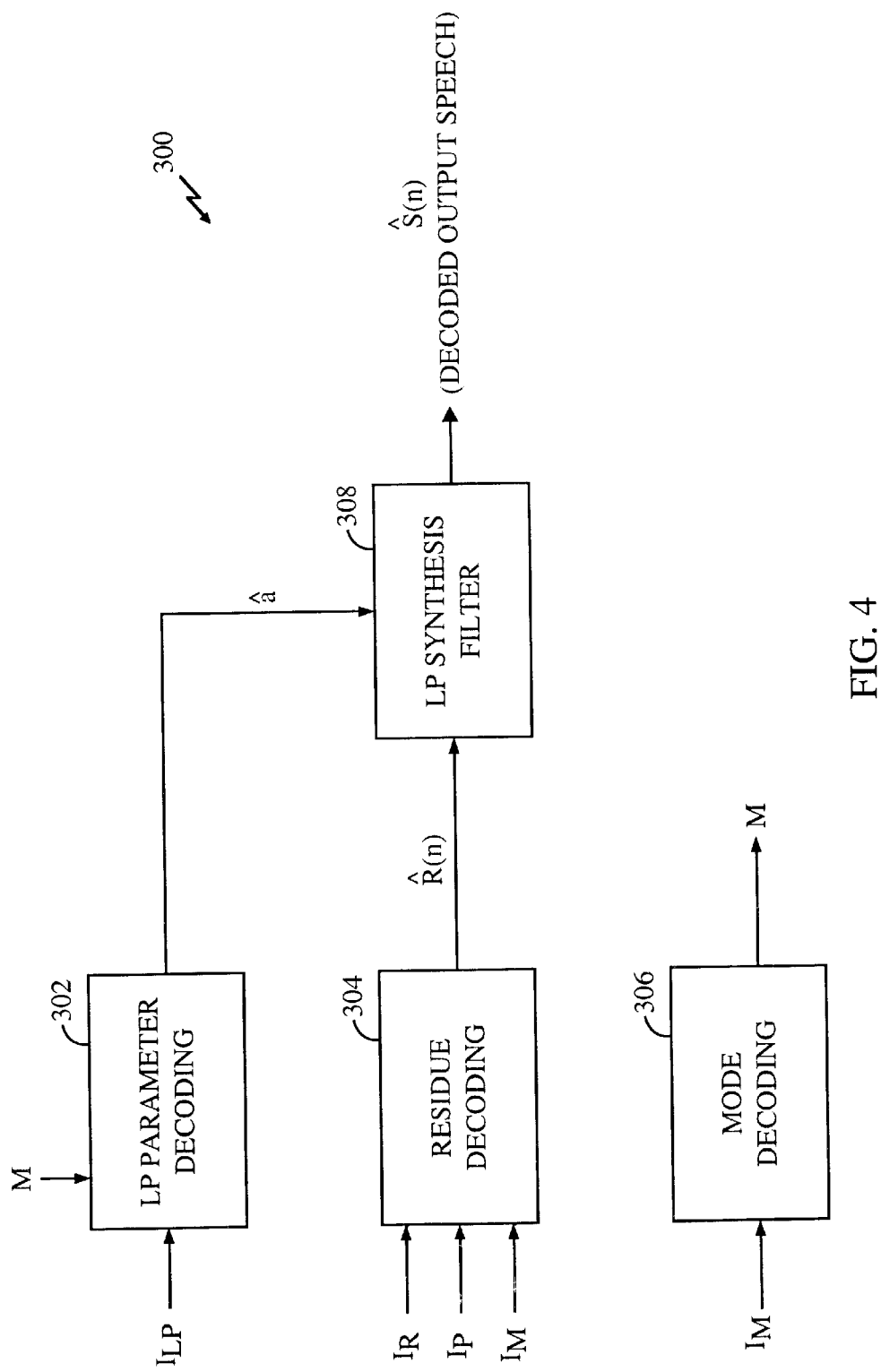
FIG. 4 is a block diagram of a speech decoder.

In FIG. 4 a decoder 300 that may be used in a speech coder includes an LP parameter decoding module 302, a residue decoding module 304, a mode decoding module 306, and an LP synthesis filter 308. The mode decoding module 306 receives and decodes a mode index $I_M$, generating therefrom a mode M. The LP parameter decoding module 302 receives the mode M and an LP index $I_{LP}$. The LP parameter decoding module 302 decodes the received values to produce a quantized LP parameter â. The residue decoding module 304 receives a residue index $I_R$, a pitch index $I_P$, and the mode index $I_M$. The residue decoding module 304 decodes the received values to generate a quantized residue signal R̂[n]. The quantized residue signal R̂[n] and the quantized LP parameter â are provided to the LP synthesis filter 308, which synthesizes a decoded output speech signal ŝ[n] therefrom.

Operation of Multi-Mode Encoder/Decoder

Figure 5:
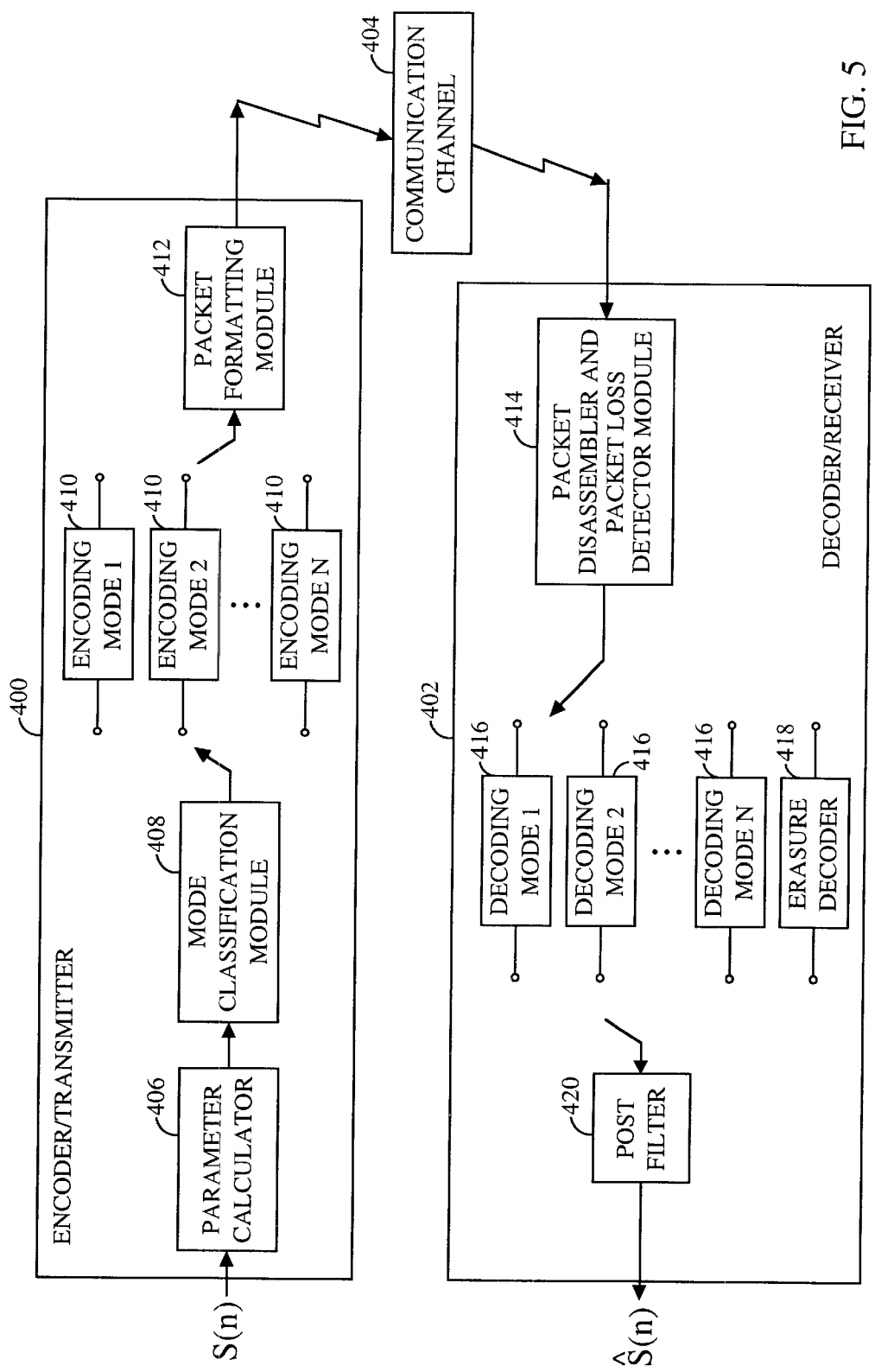
FIG. 5 is a block diagram of a speech coder including encoder/transmitter and decoder/receiver portions.

FIG. 5 illustrates the operational functions of a multi-mode speech encoder 400 communicating with a multi-mode speech decoder 402 across a communication channel, or transmission medium, 404. The communication channel 404 is advantageously an RF interface configured in accordance with the IS-95 standard. It would be understood by those of skill in the art that the encoder 400 has an associated decoder (not shown). The encoder 400 and its associated decoder together form a first speech coder. It would also be understood by those of skill in the art that the decoder 402 has an associated encoder (not shown). The decoder 402 and its associated encoder together form a second speech coder. The first and second speech coders may advantageously be implemented as part of first and second DSPs, and may reside in, e.g., a subscriber unit and a base station in a PCS or cellular telephone system, or in a subscriber unit and a gateway in a satellite system.

The encoder 400 includes a parameter calculator 406, a mode classification module 408, a plurality of encoding modes 410, and a packet formatting module 412. The number of encoding modes 410 is shown as n, which one of skill would understand could signify any reasonable number of encoding modes 410. For simplicity, only three encoding modes 410 are shown, with a dotted line indicating the possible existence of additional encoding modes 410. The decoder 402 includes a packet disassembler and packet loss detector module 414, a plurality of decoding modes 416, an erasure decoder 418, and a post filter, or speech synthesizer, 420. The number of decoding modes 416 is shown as n, which one of skill would understand could signify any reasonable number of decoding modes 416. For simplicity, only three decoding modes 416 are shown, with a dotted line indicating the possible existence of additional decoding modes 416.

A speech signal, s(n), is provided to the parameter calculator 406. The speech signal is divided into blocks of samples called frames. The value n designates the frame number. In an alternate embodiment, a linear prediction (LP) residual error signal is used in place of the speech signal. The LP residue is used by speech coders such as, e.g., the CELP coder. Computation of the LP residue is advantageously performed by providing the speech signal to an inverse LP filter (not shown). The transfer function of the inverse LP filter, A(z), is computed in accordance with the following equation:

$$A(z)=1-a_1z^{-1}-a_2z^{-2}-\ldots-a_P z^{-P},$$

in which the coefficients $a_1$ are filter taps having predefined values chosen in accordance with known methods, as described in the aforementioned U.S. Pat. No. 5,414,796 and U.S. application Ser. No. 09/217,494. The number p indicates the number of previous samples the inverse LP filter uses for prediction purposes. In a particular embodiment, p is set to ten.

The parameter calculator 406 derives various parameters based on the current frame. In one embodiment these parameters include at least one of the following: linear predictive coding (LPC) filter coefficients, line spectral pair (LSP) coefficients, normalized autocorrelation functions (NACFs), open-loop lag, zero crossing rates, band energies, and the formant residual signal. Computation of LPC coefficients, LSP coefficients, open-loop lag, band energies, and the formant residual signal is described in detail in the aforementioned U.S. Pat. No. 5,414,796. Computation of NACFs and zero crossing rates is described in detail in the aforementioned U.S. Pat. No. 5,911,128.

The parameter calculator 406 is coupled to the mode classification module 408. The parameter calculator 406 provides the parameters to the mode classification module 408. The mode classification module 408 is coupled to dynamically switch between the encoding modes 410 on a frame-by-frame basis in order to select the most appropriate encoding mode 410 for the current frame. The mode classification module 408 selects a particular encoding mode 410 for the current frame by comparing the parameters with predefined threshold and/or ceiling values. Based upon the energy content of the frame, the mode classification module 408 classifies the frame as nonspeech, or inactive speech (e.g., silence, background noise, or pauses between words), or speech. Based upon the periodicity of the frame, the mode classification module 408 then classifies speech frames as a particular type of speech, e.g., voiced, unvoiced, or transient.

Figure 6:
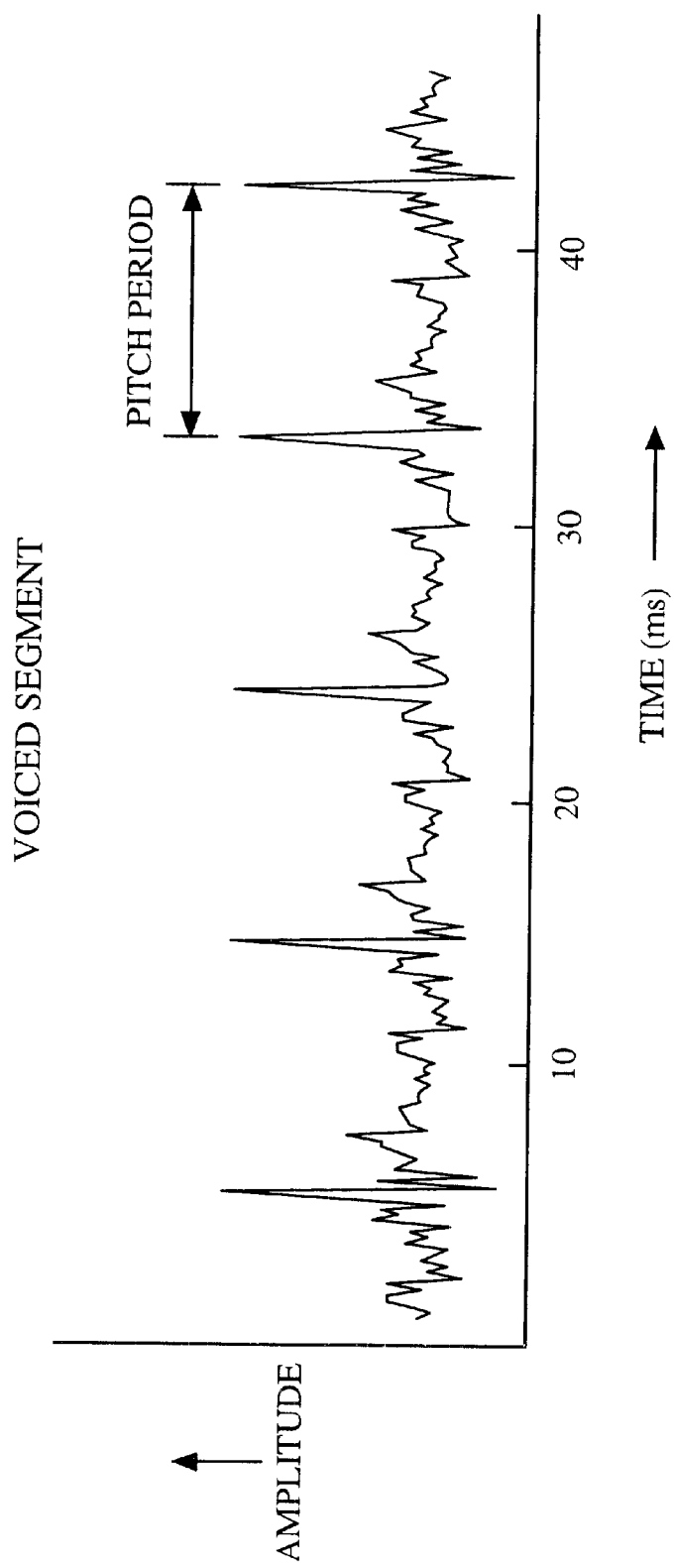
FIG. 6 is a graph of signal amplitude versus time for a segment of voiced speech.

Voiced speech is speech that exhibits a relatively high degree of periodicity. A segment of voiced speech is shown in the graph of FIG. 6. As illustrated, the pitch period is a component of a speech frame that may be used to advantage to analyze and reconstruct the contents of the frame. Unvoiced speech typically comprises consonant sounds. Transient speech frames are typically transitions between voiced and unvoiced speech. Frames that are classified as neither voiced nor unvoiced speech are classified as transient speech. It would be understood by those skilled in the art that any reasonable classification scheme could be employed.

Classifying the speech frames is advantageous because different encoding modes 410 can be used to encode different types of speech, resulting in more efficient use of bandwidth in a shared channel such as the communication channel 404. For example, as voiced speech is periodic and thus highly predictive, a low-bit-rate, highly predictive encoding mode 410 can be employed to encode voiced speech. Classification modules such as the classification module 408 are described in detail in the aforementioned U.S. application Ser No. 09/217,341 and in U.S. application Ser. No. 09/259,151 entitled CLOSED-LOOP MULTI-MODE MIXED-DOMAIN LINEAR PREDICTION (MDLP) SPEECH CODER, filed Feb. 26, 1999, assigned to the assignee of the present invention, and fully incorporated herein by reference.

The mode classification module 408 selects an encoding mode 410 for the current frame based upon the classification of the frame. The various encoding modes 410 are coupled in parallel. One or more of the encoding modes 410 may be operational at any given time. Nevertheless, only one encoding mode 410 advantageously operates at any given time, and is selected according to the classification of the current frame.

The different encoding modes 410 advantageously operate according to different coding bit rates, different coding schemes, or different combinations of coding bit rate and coding scheme. In the exemplary embodiment, the various coding rates used may be full rate, half rate, quarter rate, and/or eighth rate. The various coding schemes used may be CELP coding, prototype pitch period (PPP) coding (or waveform interpolation (WI) coding), and/or noise excited linear prediction (NELP) coding. Thus, for example, a particular encoding mode 410 could be full rate CELP, another encoding mode 410 could be half rate CELP, another encoding mode 410 could be quarter rate PPP, and another encoding mode 410 could be NELP.

In accordance with a CELP encoding mode 410, a linear predictive vocal tract model is excited with a quantized version of the LP residual signal. The quantized parameters for the entire previous frame are used to reconstruct the current frame. The CELP encoding mode 410 thus provides for relatively accurate reproduction of speech but at the cost of a relatively high coding bit rate. The CELP encoding mode 410 may advantageously be used to encode frames classified as transient speech. An exemplary variable rate CELP speech coder is described in detail in the aforementioned U.S. Pat. No. 5,414,796.

In accordance with a NELP encoding mode 410, a filtered, pseudo-random noise signal is used to model the speech frame. The NELP encoding mode 410 is a relatively simple technique that achieves a low bit rate. The NELP encoding mode 410 may be used to advantage to encode frames classified as unvoiced speech. An exemplary NELP encoding mode is described in detail in the aforementioned U.S. application Ser. No. 09/217,494.

The selected encoding mode 410 is coupled to the packet formatting module 412. The selected encoding mode 410 encodes, or quantizes, the current frame and provides the quantized frame parameters to the packet formatting module 412. The packet formatting module 412 advantageously assembles the quantized information into packets for transmission over the communication channel 404. In one embodiment the packet formatting module 412 is configured to provide error correction coding and format the packet in accordance with the IS-95 standard. The packet is provided to a transmitter (not shown), converted to analog format, modulated, and transmitted over the communication channel 404 to a receiver (also not shown), which receives, demodulates, and digitizes the packet, and provides the packet to the decoder 402.

In the decoder 402, the packet disassember and packet loss detector module 414 receives the packet from the receiver. The packet disassembler and packet loss detector module 414 is coupled to dynamically switch between the decoding modes 416 on a packet-by-packet basis. The number of decoding modes 416 is the same as the number of encoding modes 410, and as one skilled in the art would recognize, each numbered encoding mode 410 is associated with a respective similarly numbered decoding mode 416 configured to employ the same coding bit rate and coding scheme.

If the packet disassembler and packet loss detector module 414 detects the packet, the packet is disassembled and provided to the pertinent decoding mode 416. If the packet disassembler and packet loss detector module 414 does not detect a packet, a packet loss is declared and the erasure decoder 418 advantageously performs frame erasure processing as described in a related application U.S. application Ser. No. 09/557,283, filed Apr. 24, 2000, entitled FRAME ERASURE COMPENSATION METHOD IN A VARIABLE RATE SPEECH CODER, assigned to the assignee of the present invention, and fully incorporated herein by reference.

The parallel array of decoding modes 416 and the erasure decoder 418 are coupled to the post filter 420. The pertinent decoding mode 416 decodes, or de-quantizes, the packet provides the information to the post filter 420. The post filter 420 reconstructs, or synthesizes, the speech frame, outputting synthesized speech frames, ŝ(n). Exemplary decoding modes and post filters are described in detail in the aforementioned U.S. Pat. No. 5,414,796 and U.S. application Ser. No. 09/217,494.

Figure 7:
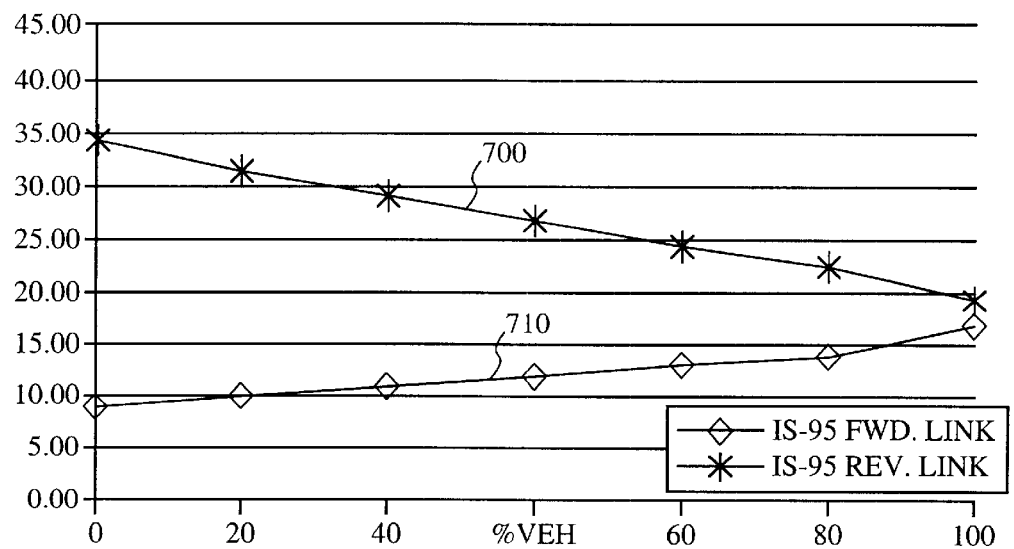
FIG. 7 is a graph of Erlang capacity vs. vehicular movement using an IS-95 system.
Figure 8:
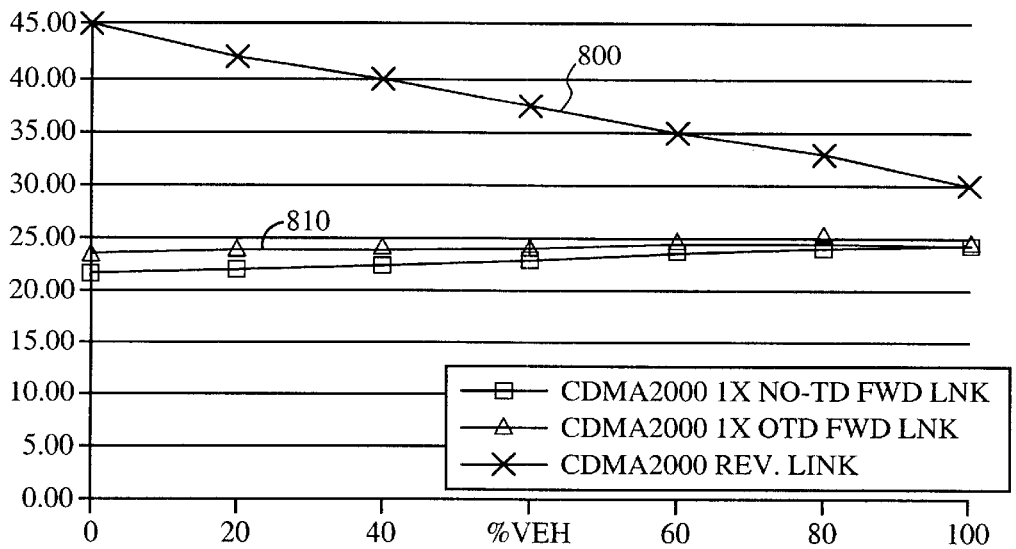
FIG. 8 is a graph of Erlang capacity vs. vehicular movement using an IS-2000 system.

Reducing Imbalances in the Forward and Reverse Links By Implementing Speech Coders Capable of Selectable Modes As discussed above, an Erlang is a unit of measurement for system capacity, wherein one Erlang is one voice channel continuously in use. FIG. 7 illustrates the Erlang capacity of an IS-95 forward link and an IS-95 reverse link as a function of user movement. Line 700 corresponds to the reverse link capacity and Line 710 corresponds to the forward link capacity. FIG. 8 illustrates the Erlang capacity of an IS-2000 forward link and an IS-2000 reverse link. Line 800 corresponds to the reverse link capacity and Line 810 corresponds to the forward link capacity. In both CDMA systems, the Erlang capacity of the forward link is significantly lower than the Erlang capacity on the reverse link while the remote station is moving at low speeds. For example, in FIG. 7, at the point where 50% of the remote stations are in movement, the capacity of the reverse link is 26.9 and the capacity of the forward link is 12. Hence, the reverse link has 2.24 times more capacity than the forward link. It should be noted that since a communication system must conduct voice activity on both forward and reverse links, the system capacity is limited by the slowest link.

A speech coder on a remote station and a speech coder on a base station are usually implemented to support the same speech encoding modes, which results in the implementation of a symmetric system that supports all data rates at all speech coders.

In one exemplary embodiment, the imbalance between the forward link capacity and the reverse link capacity can be reduced by the implementation of a speech coder that has several selectable modes, each mode associated with an average data rate. Table 1 illustrates the capacity gains of a selectable mode speech coder over a speech coder without selectable modes.

TABLE 1

Gains for a Selectable Mode Speech Encoder
(**use of ¼ rates on reverse IS-95 link is not advised)

|  | cdma2000 Fwd Link | cdma2000 Rev Link | IS95 Fwd Link | IS95 Rev Link |
|---|---|---|---|---|
| Mode 0 | 0% | 0% | 0% | ** |
| Mode 1 | 26% | 16% | 26% | ** |
| Mode 2 | 49% | 30% | 49% | ** |
| Mode 3 | 58% | ** | 58% | ** |

The modes of Table 1 are each associated with an average data rate that is achieved through the mixture of full rate, half rate, quarter rate and eighth rate frames. Table 2 illustrates the percentage mixtures of the various frames that are used to achieve each mode.

TABLE 2

Clean Speech Rate Statistics for
Operating Modes of a Selectable Mode Speech Coder

|  | Mode 0 | Mode 1 | Mode 2 | Mode 3 |
|---|---|---|---|---|
| Full Rate | 42.5% | 23.52% | 9.74% | 6.94% |
| ½ Rate | 5.5% | 10.87% | 24.51% | 23.65% |
| ¼ Rate | 0% | 11.32% | 10.60% | 14.27% |
| ⅛ Rate | 52% | 54.30% | 55.14% | 55.14% |

It should noted that the increasing mode number is indicative of the tradeoff between system capacity and voice quality. For example, Mode 0 provides high voice quality at the expense of low system capacity, while Mode 2 provides a higher system capacity at the expense of a low voice quality. In an embodiment, a new mode 3 is provided to achieve a lower average data rate than Mode 2 with insignificant losses in voice quality, so that added flexibility is provided to the carrier in trading off system capacity and voice quality.

In this particular embodiment, Mode 3 is implemented using quarter rate NELP coding aggressively for unvoiced frames and quarter rate Time Synchronous Waveform Interpolation (TSWI) coding for very stationary voiced frames.

Hence, the imbalance between the Erlang capacity of the forward link and the Erlang capacity of the reverse link is reduced due to the increase of the forward link capacity, wherein the increased forward link capacity is achieved through the implementation of selectable modes, such as modes 2 and 3, while the reverse link capacity is maintained with the implementation of modes 0 or 1. Hence, the speech coders utilized for the forward and reverse links operate in non-symmetric modes. For example, in an IS-2000 system according to FIG. 8, the reverse link has the capacity of 37.4 users while operating at mode-0 and the forward link has a capacity of 23.3 users at mode-0. However, if the forward link is set to operate at mode 2, then the capacity increases by 49%. Consequently, 34.7 users can be serviced by the forward link.

Exploiting Imbalances in the Forward and Reverse Links to Reduce Speech Coder Complexity In some situations, the imbalance caused by the lower capacity forward link need not be a constraint in a system wherein data traffic is transmitted. For example, transferring packetized data packets from a base station to a remote station usually consists of "downloading" large amounts of data. However, transferring packetized data packets from a remote station to a base station usually consists of "uploading" smaller data packets. In this example, the forward link is generally slow because of the need to transfer a large amount of data and the reverse link is generally fast because there is a low capacity demand.

Figure 9:
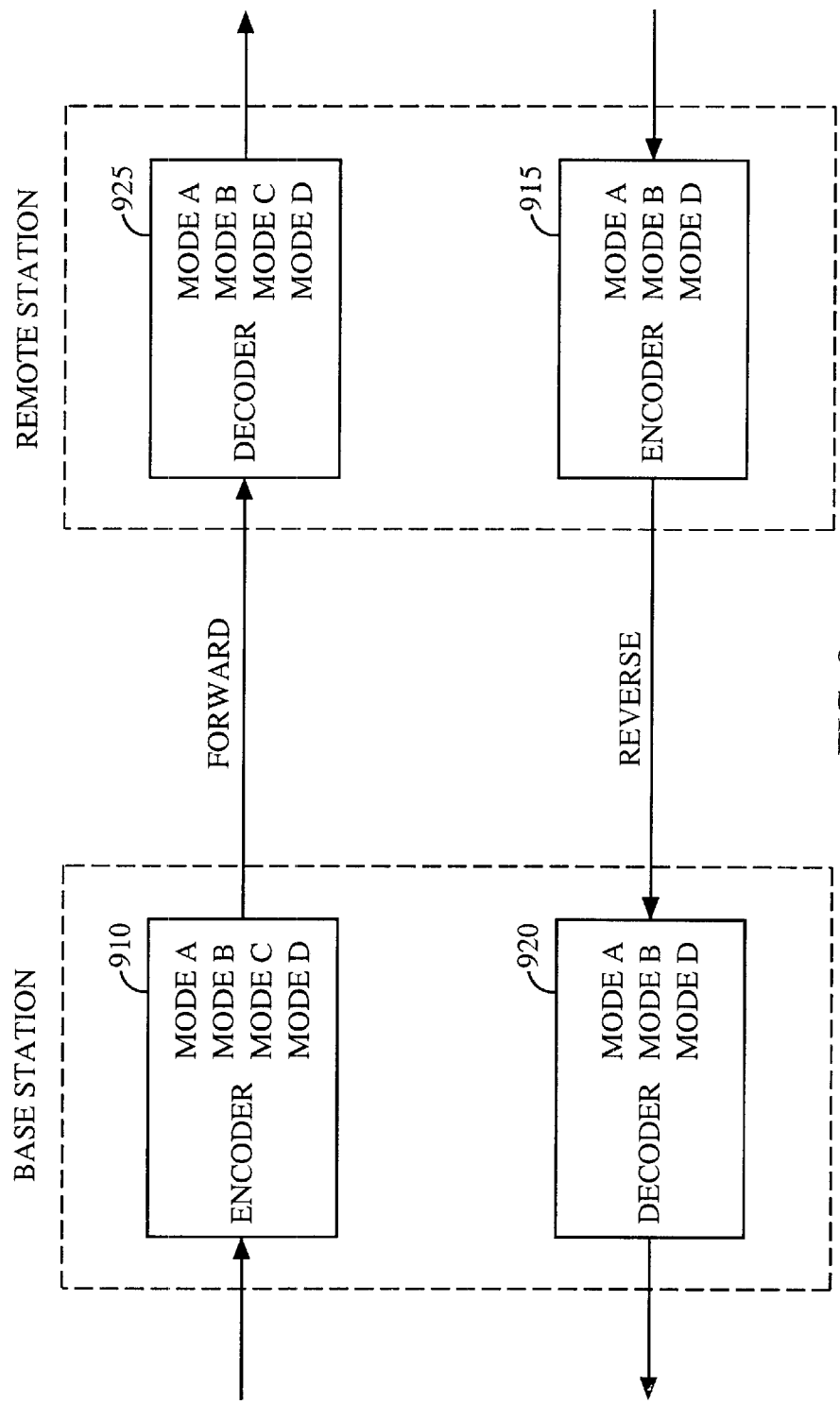
FIG. 9 is a block diagram of non-symmetric speech coders operating on the forward and reverse links of a communication session.

In one embodiment, the imbalance between the capacities of the forward and reverse links is exploited to allow a reduction in the complexity of the speech encoder located at the remote station and the speech decoder located at the base station. FIG. 9 illustrates this embodiment. A first encoder 910 is located at a base station that is capable of four modes; mode A, mode B, mode C, and mode D, wherein each mode represents a different average data rate generated by the combination of full rate, half rate, quarter rate, and eighth rate frames. Mode A has the highest average data rate, mode B has the second highest average data rate, mode C has the third highest average data rate, and mode D has the lowest average data rate. During the course of a forward link transmission, the average data rate of the forward link corresponds to the average data rate of mode C, so that the forward link is near full capacity.

Because the first encoder 910 is capable of transmitting in all four modes, the first decoder 920, located at a remote station, must be capable of receiving frames at the average data rates of all four modes.

However, due to the larger capacity of the reverse link, the second encoder 915, located at the remote station, can transmit at a high average data rate, such as mode A. In one aspect of the embodiment, a predetermination is made that the remote station may never need to transmit data frames using mode C. Correspondingly, the second encoder 915, located on the remote station, is implemented without the capability of transmitting data at the average data rate of mode C. Since the second encoder 915 can never use mode C, the second decoder 925, located at the base station, may be implemented without having to support mode C.

Hence, FIG. 9 illustrates an implementation of the exemplary embodiment wherein the complexity of the reverse link encoders and decoders is reduced by eliminating modes operating at lower average data rates. It should be noted that the use of four modes used in FIG. 9 is for illustrative purposes, and that the implementation of more or fewer modes may be accomplished without departing from the spirit or scope of the invention.

The implementation of the embodiment as illustrated in FIG. 9 is applicable both in an unbalanced system and in a balanced system. In a balanced system, wherein balance is achieved through non-symmetric mode selection on the forward and reverse links, the predetermination that certain low rate modes will not be utilized allows the implementation of a simplified speech coder that lacks a full set of encoders and decoders.

Thus, a novel and improved method and apparatus for creating non-symmetric forward and reverse links have been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to a storage medium so as to read information from, and write information to, the storage medium. In the alternative, the storage medium may be integral to the processor. The processor and the storage medium may reside in an ASIC. The ASIC may reside in a telephone. In the alternative, the processor and the storage medium may reside in a telephone. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A method for balancing the capacity of a forward link in a wireless communication system with the capacity of a reverse link in the wireless communication system, comprising the steps of:

operating a first speech coder with a first set of modes on the forward link, wherein at least one mode in the first set of modes is associated with a low average data rate; and operating a second speech coder in a second set of modes on the reverse link, wherein each mode in the second set of modes is associated with a high average data rate.

2. A method for transmitting frames of data in a wireless communication system, comprising the step of balancing the capacity of a forward link of the wireless communication system with the capacity of a reverse link of the wireless communication system, wherein the step of balancing is accomplished by using a forward link speech coder that operates at a first mode on the forward link, wherein the first mode is not symmetric to a second mode by which a reverse link speech coder is operating.

3. A system for balancing the capacity of a forward link with the capacity of a reverse link in a wireless communication system, comprising;
a forward link speech coder that selectively operates in a plurality of modes, wherein at least one of the plurality of modes is associated with a low average data rate; and
a reverse link speech coder that selectively operates in a reduced plurality of modes, wherein each of the reduced plurality of modes is associated with a high average data rate.

4. A method for transmitting frames of data in a forward link and a reverse link of a wireless communication system, comprising the steps of:
operating a forward link speech coder in a first plurality of modes; and
operating a reverse link speech coder in a second plurality of modes, wherein at least one mode in the second plurality of modes is different from each mode in the first plurality of modes.

5. A method for transmitting frames of data in a forward link and a reverse link in a wireless communication system, comprising the steps of:
operating a forward link speech coder in a first plurality of modes; and
operating a reverse link speech coder in a second plurality of modes, wherein at least one mode in the second plurality of modes is the same as a mode in the first plurality of modes.

6. A method for transmitting frames of data in a forward link and a reverse
link of a wireless communication system, comprising the steps of:
operating a forward link speech coder in a first plurality of modes; and
operating a reverse link speech coder in a second plurality of modes, wherein at least one mode in the first plurality of modes is different from each mode in the second plurality of modes.

7. A method for transmitting frames of data in a forward link and a reverse link in a wireless communication system, comprising the steps of:
operating a forward link speech coder in a first plurality of modes; and
operating a reverse link speech coder in a second plurality of modes, wherein at least one mode in the first plurality of modes is the same as a mode in the second plurality of modes.

* * * * *